United States Patent
Cable et al.

(10) Patent No.: US 7,276,294 B2
(45) Date of Patent: Oct. 2, 2007

(54) NYLON BARRIER BOARD STRUCTURE

(75) Inventors: Kevin Cable, Waynesville, NC (US); Steven Frohock, Canton, NC (US)

(73) Assignee: BRPP, LLC, Canton, NC (US)

( * ) Notice: Subject to any disclaimer, the term of this patent is extended or adjusted under 35 U.S.C. 154(b) by 134 days.

(21) Appl. No.: 10/431,955

(22) Filed: May 8, 2003

(65) Prior Publication Data

US 2004/0224172 A1   Nov. 11, 2004

(51) Int. Cl.
B32B 27/00 (2006.01)
B32B 27/34 (2006.01)
B32B 29/00 (2006.01)

(52) U.S. Cl. .............. 428/474.4; 428/475.8; 428/475.5; 428/479.6

(58) Field of Classification Search .......... 428/474.4, 428/475.8, 475.5, 479.6
See application file for complete search history.

(56) References Cited

U.S. PATENT DOCUMENTS

| | | | |
|---|---|---|---|
| 4,698,246 A | 10/1987 | Gibbons et al. | 428/35 |
| 4,701,360 A | 10/1987 | Gibbons et al. | 428/35 |
| 4,753,832 A | 6/1988 | Brown et al. | 428/35 |
| 4,777,088 A | 10/1988 | Thompson et al. | 428/323 |
| 4,789,575 A | 12/1988 | Gibbons et al. | 428/34.2 |
| 4,806,399 A | 2/1989 | Gibbons et al. | 428/34.2 |
| 4,950,510 A | 8/1990 | Massouda | 428/34.2 |
| 4,977,004 A | 12/1990 | Bettle, III et al. | 428/36.7 |
| 5,712,006 A | 1/1998 | Marano et al. | 428/34.2 |
| 5,968,647 A | 10/1999 | Adur et al. | |
| 6,114,456 A | 9/2000 | Dewart et al. | 525/240 |
| 6,372,317 B1 | 4/2002 | Denney et al. | 428/34.2 |
| 2002/0051873 A1 | 5/2002 | Castle et al. | |
| 2003/0148110 A1 | 8/2003 | Holbert et al. | |

FOREIGN PATENT DOCUMENTS

WO   WO99/50066   * 10/1999

OTHER PUBLICATIONS

PCT/US04/14305, International Search Report, Oct. 1, 2004, 2 pages, ISA/US, Alexandria, Virginia 22313-1450 US.

* cited by examiner

Primary Examiner—James J. Seidleck
Assistant Examiner—Saira B. Haider
(74) Attorney, Agent, or Firm—J. Bennett Mullinax, LLC

(57) ABSTRACT

A paperboard laminate useful for making gable top juice cartons is provided. The laminate provides for a high melting point polymer such as a semi-crystalline nylon to be applied directly to a board surface as an oxygen barrier layer. An anti-scalping layer is also provided by a polar polymer which is connected by a tie layer to an outermost skin coat layer. Positioned between the skin coat layer and the oxygen barrier layer are one or more bulk layers of polyolefins. The resulting laminate affords a juice carton which has good oxygen barrier and Vitamin C retention properties, is resistant to overactivation during heat sealing, has minimal scalping of d-limonene and essential oils, and has excellent bulge resistance.

4 Claims, 5 Drawing Sheets

| Polyolefin | 12 |
| Paperboard | 10 |
| Nylon-6 | 14 |
| Tie Layer | 16 |
| Polyolefin | 18 |
| Tie Layer | 20 |
| Nylon-6 | 22 |
| Tie Layer | 24 |
| Polyolefin | 26 |

| | |
|---|---|
| Polyolefin | 12 |
| Paperboard | 10 |
| Nylon-6 | 14 |
| Tie Layer | 16 |
| Polyolefin | 18 |
| Tie Layer | 20 |
| Nylon-6 | 22 |
| Tie Layer | 24 |
| Polyolefin | 26 |

Figure 1

NYLON BARRIER BOARD STRUCTURE

FIELD OF THE INVENTION

The present invention is directed towards a paperboard laminate useful for making containers for citrus juices and beverages, as well as dried food products. In addition, the paperboard laminate is useful for making containers for liquid non-food products such as fabric softeners. The present invention uses two layers of Nylon 6 separated by a low density polyethylene layer to provide a resulting laminated structure having good oxygen barrier properties, abuse resistance, and protection of products packaged therein against the loss of vitamins, flavor, and essential oils. The innermost layer of Nylon 6 is applied directly to the board substrate and provides an oxygen barrier which also protects against overactivation of the board. An additional layer of Nylon 6 provides an anti-scalping layer and is placed adjacent the skin coat layer. The skin coat layer and the adjacent Nylon 6 layer are joined by an adhesive tie layer. The resulting laminate provides for a board structure and carton which are resistant to the creation of pin holes in the laminated layers which may occur through overactivation of the board. Further, the resulting cartons have excellent resistance to scalping. The resulting laminate structure also provides for an assembled carton which, when filled with an aqueous liquid, has good resistance to carton bulge over the life of the carton.

BACKGROUND OF THE INVENTION

This invention relates to coated paperboard which may be used within the beverage industry to provide containers for citrus and fruit juices, milk, and other liquid and non-liquid food products. A variety of coating layers are known to be used to provide useful properties to the resulting paperboard laminate. For instance, within the citrus juice industry paperboard cartons have coatings designed to provide an oxygen barrier. The incorporation of oxygen barriers into a laminate structure helps preserve Vitamin C content against oxidative loss and contributes to a longer product shelf life.

In addition, juice cartons are prone to scalping of essential oils in the carton's contents by the skin or product contact layer of the laminated board. As such, barrier coatings which provide increased resistance to scalping are also desirable.

Extruded nylon has been used as one layer of a multi-component laminated structure for a barrier board. One such barrier board which provides for oxygen barrier properties and reduces essential oil loss is disclosed in Thompson et al, U.S. Pat. No. 4,777,088.

Brown et al, U.S. Pat. No. 4,753,832, also discloses a nylon oxygen barrier layer as part of a laminated structure. The Brown et al layer provides a skin layer of glycol-modified polyethylene terephathalate (PET-G).

Parks et al, U.S. Pat. No. 6,149,993, discloses a layer of amorphous nylon as an oxygen barrier structure. Amorphous nylon has relatively low strength as compared to Nylon-6 and other semi-crystalline nylon structures. The Park et al reference proposes that the oxygen barrier properties of amorphous nylon are equivalent to the barrier properties of laminated structures containing ethylene vinyl alcohol (EVOH).

An EVOH barrier laminated structure may be seen in reference to the Gibbons et al, U.S. Pat. No. 4,701,360, in which EVOH is provided as a heat-sealable oxygen barrier that offers resistance to scalping when present as the skin layer of a board laminate.

While the art provides for a variety of laminated barriers for cartons, there remains for room for variation and improvement within the art.

SUMMARY OF THE INVENTION

It is one aspect of at least one of the present embodiments of the invention to provide an improved, heat-sealable laminated board structure for a juice carton which exhibits excellent oxygen barrier properties. The oxygen barrier properties provide for the retention of high Vitamin C levels. Juice cartons constructed from the laminate board structure also offer good resistance to scalping of essential oils.

It is yet another object of at least one of the present embodiments to provide a heat-sealable paperboard laminated structure which may be used for fruit or citrus juices, other beverages, dry food products, and non-food liquid products such as fabric softeners. The multi-layer laminated structure contains two distinct, separated layers of a high melting temperature polyamide such as Nylon 6 applied to the product side of a paperboard substrate. The innermost layer of Nylon 6 provides an oxygen barrier which is resistant to overactivation. The outermost layer of Nylon 6 provides a barrier against scalping of essential oils which further protects the extruded, laminated layers during heat sealing steps associated with the folding and filling of cartons.

It is yet another aspect of at least one of the present embodiments of the invention to provide a laminated board structure in which the extruded polymer layer prevents blistering and pinholing of the laminated layers (overactivation) during heat sealing of the cartons. In accordance with this invention, it has been found that when a carton is heat sealed, the paperboard substrate is often raised to a temperature in excess of the boiling point of water. As such, moisture in the paperboard layer turns to steam, the release of which may compromise the structural integrity of the various laminated layers (board overactivaton). The damaged lamination layers provide undesirable pathways through the laminated structure for oxygen and moisture. Several of the embodiments described herein provide for laminated structures which are resistant to overactivation.

Thus, in one embodiment of the present invention a paperboard, coated with an outer heat-sealable polyolefin layer, is provided as a coated base substrate upon which an inner, laminated structure is extruded. The extruded, laminated structure, from the exterior (gloss side) of the laminated structure to the interior of the structure, comprises the following layers:

polyolefin/paperboard/Nylon 6/tie layer/polyolefin/tie layer/Nylon 6/tie layer/polyolefin.

It is yet another embodiment of at least one of the present inventions to provide a laminated structure for paperboard cartons in which an outer skin layer of a polyolefin or other heat-sealable material is attached to an anti-scalping layer such as Nylon 6, Nylon 6/6, amorphous nylon, or other polar polymer material using an adhesive tie layer. The anti-scalping layer, when a high melting polar polymer is used, also provides additional protection to the paperboard against overactivation.

Cartons can be constructed from the laminates of the present invention which provide excellent gas-barrier protection for food and non-food products. Further, the resulting carton has been found to offer a significant reduction in scalping of essential oils which further extends the shelf life and quality of a juice product.

These and other features, aspects, and advantages of the present invention will become better understood with reference to the following description and appended claims.

BRIEF DESCRIPTION OF THE DRAWINGS

A fully and enabling disclosure of the present invention, including the best mode thereof, to one of ordinary skill in the art is set forth more particularly in the remainder of the specification, including reference to the accompanying drawings.

FIG. 1 is a schematic cross-section illustrating a barrier board laminate according to the present invention;

DESCRIPTION OF THE PREFERRED EMBODIMENT

Figure 2:
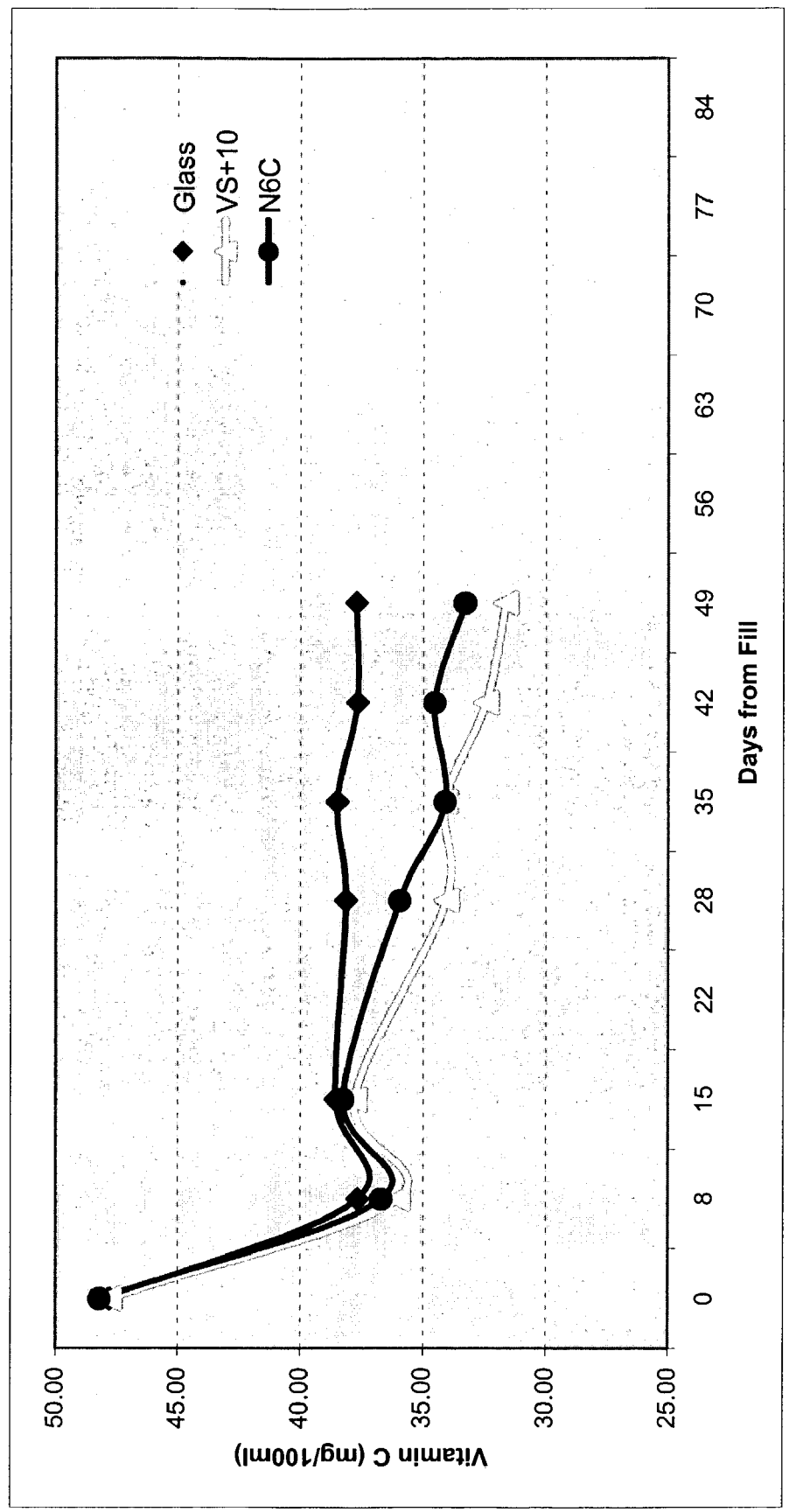
FIG. 2 is a graphical representation of Vitamin C retention in a carton constructed from a laminate in accordance with the present invention.

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus or process pathway. To avoid redundancy, detailed descriptions of much of the apparatus once described in relation to a figure is not repeated in the descriptions of subsequent figures, although such apparatus or process is labeled with the same reference numbers.

An embodiment of the present invention may be provided by a paperboard laminate having the structure as seen in reference to FIG. 1. When the structure is assembled into a carton, the structure has been found to provide excellent oxygen barrier properties, good resistance to bulge, resistance to oxidative loss of Vitamin C, and provides a skin coat layer which minimizes the uptake of essential oils such as d-limonene.

The laminated structure 1, as seen in reference to FIG. 1, may be provided by a conventional paperboard substrate. The substrate used herein is a 23 point paperboard 10 having a basis weight of 280 lbs/ream. A gloss or exterior surface 12 of the paperboard 10 may be provided as a 16 lb/ream weight coating of low density polyethylene (LDPE) applied following conventional flame treatment of the paperboard substrate. Subsequent corona treatment, as is conventional within the art, is used to achieve a surface energy of about 42 to about 43 dyns which facilitates printability of the gloss layer(s).

As seen in FIG. 1, an interior surface of the board has extruded thereon, in sequence from the board to the outermost product contact layer, a 5 lb. layer of Nylon 6 (layer 14); a 5 lb. layer of an adhesive tie layer (layer 16); a 20 lb. layer of LDPE (layer 18); a 3 lb. layer of an adhesive tie layer (layer 20); a 3 lb. layer of Nylon 6 (layer 22); a 3 lb. layer of an adhesive tie (layer 24); and, a skin coat layer of 3 lb. of LDPE (layer 26). In all examples set forth herein, the coating weights are per 3,000 sq. ft. of board surface.

The LDPE used on the gloss 12 and skin coat layer 26 is a Chevron 4517 LDPE which may be extruded onto the board at a temperature of about 600° F. The possible operative extrusion temperatures of LDPE are well known to one having ordinary skill in the art and may be varied within the known acceptable temperature ranges. The Nylon 6 is a B85QP (Honeywell) material extruded at 580° F., though a lower extrusion temperature of about 500° F. is recommended. The respective tie layers are low density polyethylene Plexar® 175 (Quantum Corp.) and may be extruded at a temperature of about 600° F.

The resulting laminate may be scored and cut into blanks which may be subsequently folded. The side seams may be heat sealed as is conventional within the art. The prepared blanks are then ready to be filled with juice or other product and sealed using conventional equipment and techniques.

While the structure seen in reference to FIG. 1 and described in more detail above is given in reference to specific polymers and tie layers, a variety of different polymers may be used in accordance with the scope of the present invention. For instance, suitable heat-sealable polyolefins may include polypropylene, high density polyethylene, medium density polyethylene, low density polyethylene, linear low density polyethylene, and combinations thereof. Various additives may be included in the polyolefins so as to achieve desired extrusion, adhesion, or heat sealing properties. Coating weights for the gloss side of the board may be between about 6 to about 20 lbs/ream. The skin coat weights of the polyolefins may vary between about 2 to about 28 lbs/ream. However, as noted below, a skin coat layer selected from the lower end of the coating ranges is preferred so as to minimize scalping of essential oils.

Positioned between the oxygen barrier layer 14 and the anti-scalping layer 20 is a relatively thick 20 lb. layer of LDPE (layer 18). The inclusion of a relatively thick layer of LDPE within the laminated structure has been found useful in that the added bulk material further minimizes the overactivation of board during heat sealing. Additionally, the LDPE layer 18 also limits water vapor loss of carton contents which is particularly important for non-refrigerated liquids such as fabric softeners which must have extended shelf lives in low humidity storage environments. The bulk and density of the LDPE helps insulate the board substrate during heat sealing operations and provides for a more rigid carton which resists bulge. While a 20 lb. coating weight is used in the example set forth below, the coating weight of the LDPE may range from between about 10 to about 24 lbs/ream. Additionally, the various polyolefins described above may also be used in place of the low density polyethylene within layer 18. Likewise, similar properties may be achieved by using multiple layers of polyolefin, along with any necessary adhesive tie layers, so as to achieve the similar benefits and attributes of the bulk polyolefin layer 18.

Paperboards suitable for use with the present invention may include a range of paperboard stock having a basis weight of between about 150 to about 300 lbs/ream.

The oxygen barrier layer 14, represented in FIG. 1 by the 5 lb. Nylon 6 layer, may include other extrudable polymers including other semi-crystalline nylons or semi-crystalline polyamides such as Nylon 4/6, Nylon 6/6, Nylon 6/12, Nylon 11, and Nylon 12, aromatic containing polyamides, as well as Amorphous Nylon, EVOH, blends of Amorphous Nylon/EVOH, PET, PET-G, other polyesters and combinations thereof. The oxygen barrier layer may be present in a coating weight of between about 3 to about 16 lbs/ream, the coating weight varying depending upon the actual oxygen barrier material selected. It is well within the skill level of one having ordinary skill in the art to select and apply an appropriate amount of an oxygen barrier material by conducting routine tests to determine the effectiveness of the oxygen barrier. The high melting point oxygen barriers such as the semi-crystalline nylons or semi-crystalline polyesters are believed most useful in minimizing overactivation of the board during heat sealing operations and are preferably applied directly to a surface of the board.

The tie resins suitable for co-extrusion with the individual laminated layers may include a variety of conventional tie resins such as anhydride modified co-polymers available under the trade name of Bynel® (DuPont Corp.) along with the Plexar® resins noted above. Useful coating levels of tie layers include about 2 to about 6 lbs/ream coating weight.

The anti-scalping layer, represented in FIG. 1 by the 3 lb. layer of Nylon-6, may include other extrudable barrier layers or films. In at least one embodiment of the present invention, it is useful if the anti-scalping layer is selected from a polar polymer or film having a high melting point. The high melting point further minimizes transfer of heat from the skin coat side of the laminate to the underlying board substrate, thereby minimizing overactivation of the board and the resulting pin holes or blistering of the oxygen barrier layers and laminated layers which results from evolved steam. As such, the integrity of the oxygen barrier layer(s) is maintained.

Amorphous nylon may also be used as the anti-scalping layer 22. Amorphous nylon provides excellent oxygen barrier properties to the overall structure and works well in high humidity environments such as those encountered in refrigerated juice cartons.

As set forth in the examples which follow, a structure as seen in FIG. 1 (N6C) and comparative structures were evaluated with respect to Vitamin C retention, d-limonene uptake (scalping), and carton bulge. The comparative structures included quart size glass containers (glass). Additionally, a commercially available control structure having the designation VS+10 was also evaluated. The VS+10 structure is as follows:

16#LDPE/23 point 280#board/5#Nylon-6/5#Plexar® 175 tie layer/26#LDPE

EXAMPLE 1

A laminate according to the embodiment seen in reference to FIG. 1 was prepared and converted into carton blanks as previously described. The carton blanks were filled with orange juice under refrigerated conditions and stored at 5° C. for 49 days. Vitamin C levels were determined on the intervals as seen in reference to FIG. 2, using established protocols of starch-iodine titration. Comparison tests from the glass and VS+10 containers were also conducted. The results, set forth in FIG. 2, indicate that the N6C laminate has Vitamin C retention properties better than the VS+10 comparative structure. The Vitamin C data indicates that the laminate constructed according to one aspect of the present invention provides an effective oxygen barrier as reflected by the improved Vitamin C levels. Oxidative loss of Vitamin C within paperboard cartons is correlated with oxygen transmission rates through the laminated structure, along with dissolved oxygen and head space oxygen. The improvements in oxygen transmission are believed attributable to the integrity of the oxygen barrier layers and other laminate layers which are present during the heat sealing steps.

Figure 3:
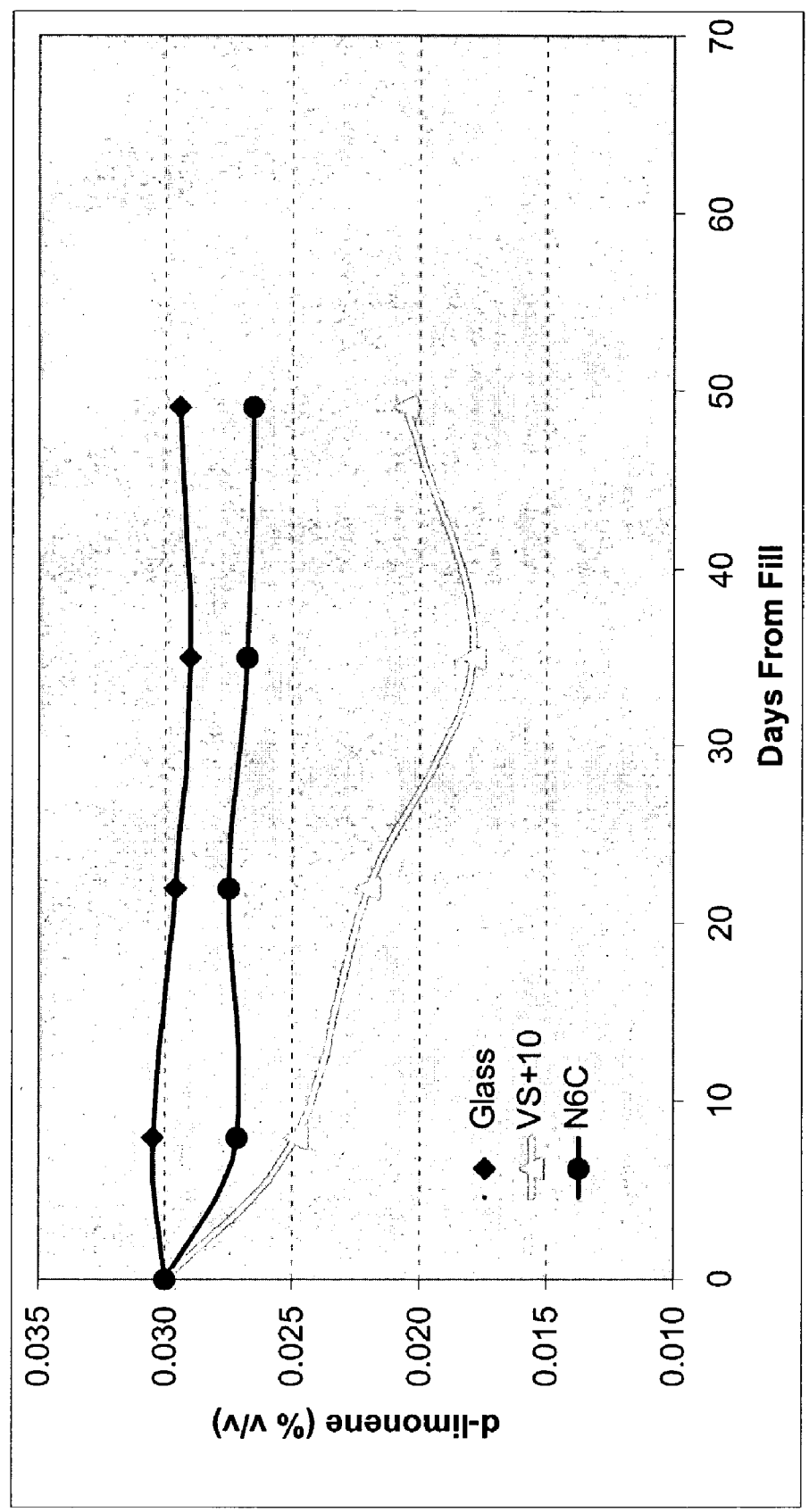
FIG. 3 is a graph of d-limonene levels of orange juice in cartons according to the present invention; and, FIGS. 4A and 4B are graphical representations of the respective bulge and normalized bulge properties of cartons according to the present invention.

As seen in reference to FIG. 3, the laminate of the present invention also provides significant improvements with respect to scalping of d-limonene, an essential oil. The measurements of d-limonene are set forth as percent volume in FIG. 3 and were derived using the Scott method for percent oil. As indicated in the data in FIG. 3, the d-limonene loss is greatly improved compared to the control VS+10 structure. The improvements in d-limonene loss are attributable to the anti-scalping barrier of Nylon 6 material which is secured to the skin coat layer by a tie layer. The polar nature of the anti-scalping barrier limits the uptake of d-limonene to the relatively thin skin coat layer 26 and adhesive tie layer 24. Further, d-limonene loss compares favorably to the glass container indicating only a minimal amount of d-limonene loss attributable to scalping. As reflected by the data in FIG. 3, the majority of d-limonene loss occurs immediately following filling and d-limonene levels are substantially stable thereafter. To the extent an anti-scalping barrier such as Nylon-6 is used which also has oxygen barrier properties, the overall oxygen barrier properties of the resulting laminate are also enhanced.

Figure 4A:
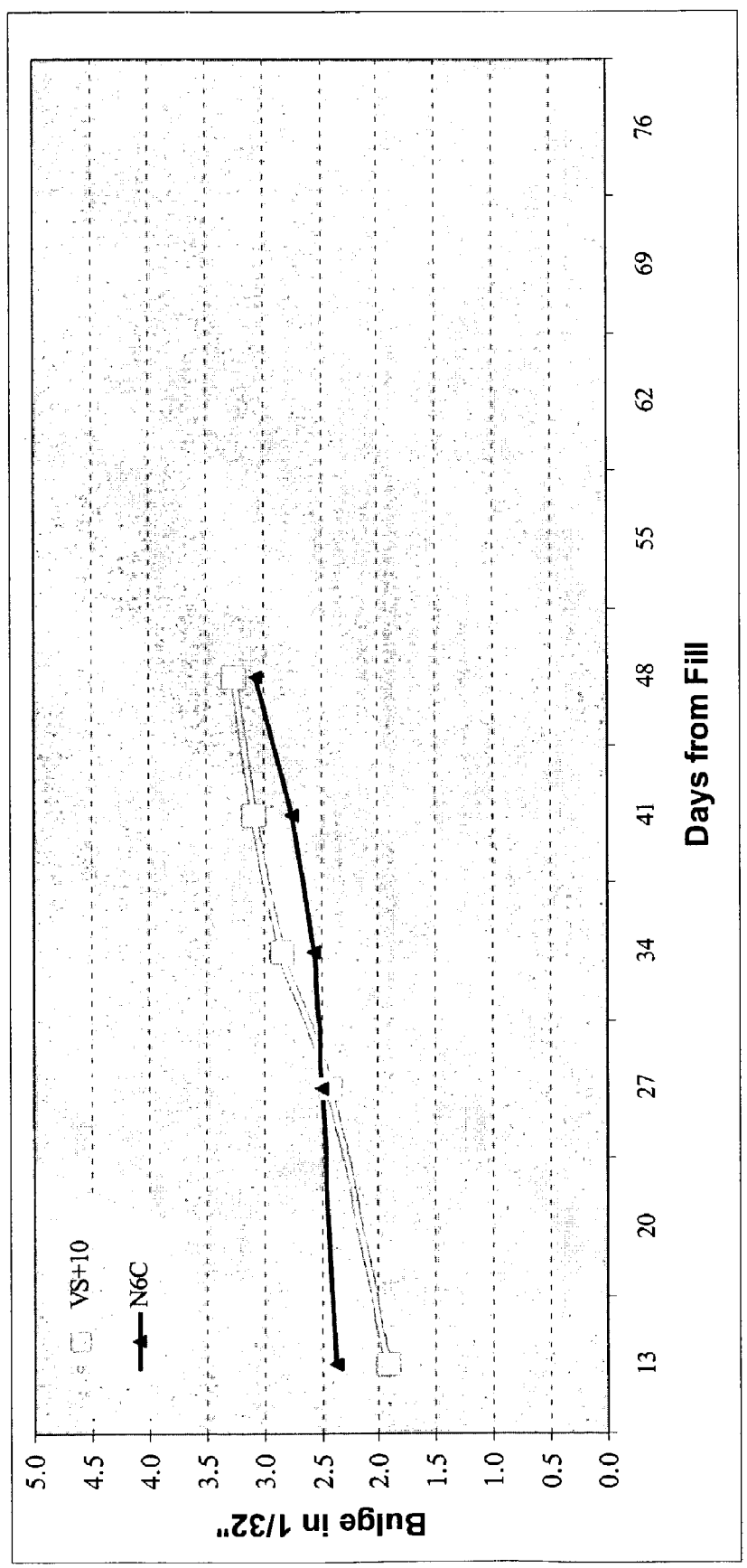
Figure 4B:
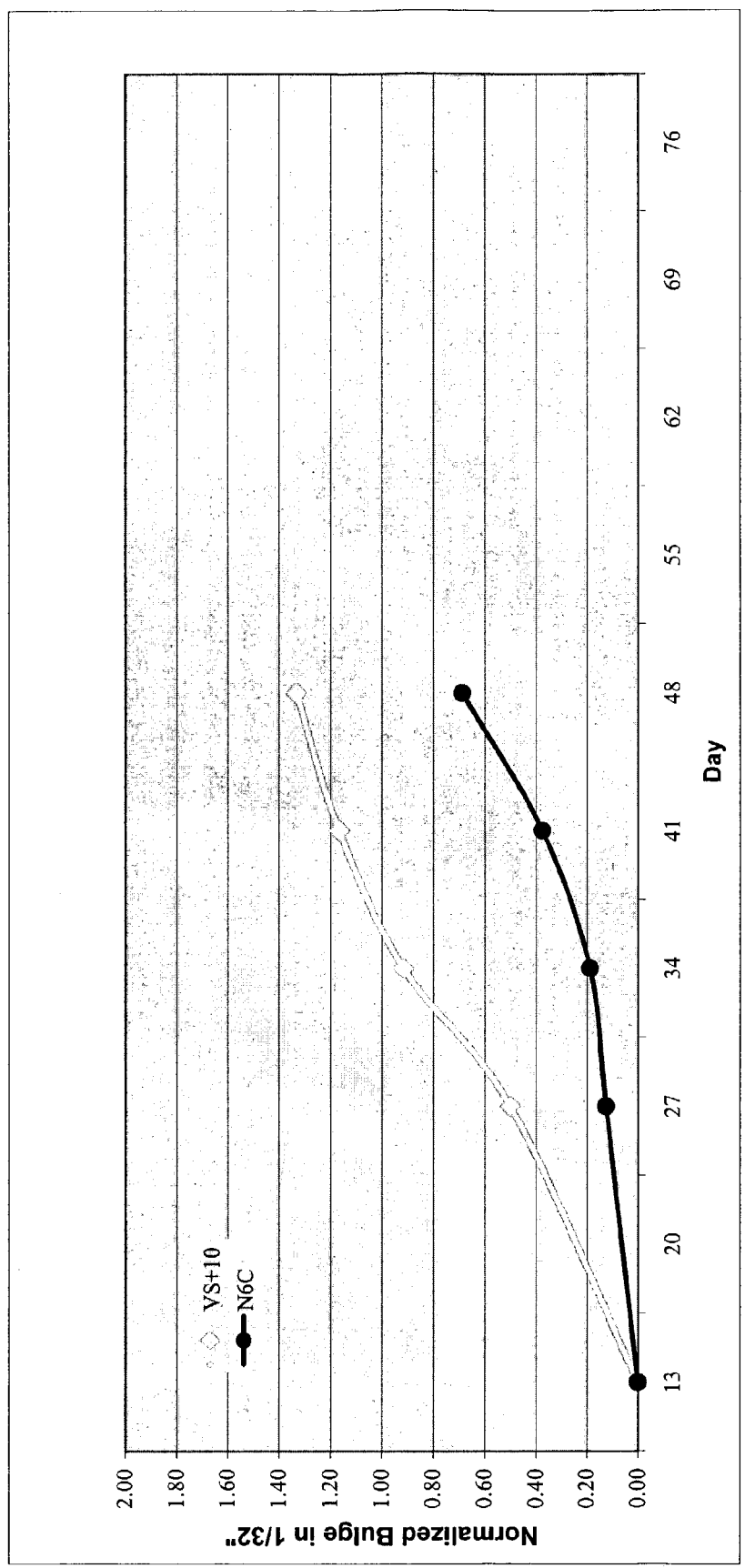

As seen in reference to the data set forth in FIGS. 4A and 4B, bulge data for the control VS+10 structure and the N6C structure of the present invention were measured and plotted. As seen, the N6C carton is more resistant to bulge than the control VS+10 structure. Carton bulge, as described in Applicant's commonly assigned U.S. Pat. No. 6,372,317, and which is incorporated herein by reference in its entirety and for all purposes, may be controlled by reducing the rate of moisture transmission through the carton board. Without being limited by theory, it is believed that the improvements in carton bulge are attributable in part to the improved integrity of the laminated layers which form the carton. The ability of the resulting board structure to avoid overactivation preserves the structural and functional integrity of the laminated layers. Improved integrity minimizes both oxygen transmission rates and water vapor transmission rates. The reduction in water transmission rates is believed to correlate with the noted improvements seen in carton bulge.

Additionally, the use of a high semi-crystalline nylon as discussed in some embodiments as oxygen barrier layers and/or an anti-scalping layer, imparts additional stiffness to the laminated structure which also contributes to the overall bulge resistance of the carton.

As set forth in Applicant's co-pending application having Ser. No. 60/428,293, entitled Improved Flavor Barrier, and which is incorporated herein by reference in its entirety, calcium carbonate and other organic and inorganic fillers described may be incorporated into skin coat 26 and tie layer 24 at a percent by weight loading of at least about 10 to 20 percent. The inclusion of a filler into the skin coat and tie layer resins will further reduce the amount of d-limonene which is scalped by the polyolefin polymers.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged, both in whole or in part. Therefore, the spirit and scope of the appended claims should not be limited to the description of the preferred versions contained therein.

What is claimed is:

1. A laminate structure consisting of:
   a paperboard substrate having an inner surface and an outer surface;
   a layer of a heat-sealable polymer coated on the outer surface of the paperboard substrate;
   a first layer consisting of nylon 6 layer coated on the inner surface of the paperboard substrate;
   a first tie layer coated on an inner surface of the first nylon 6 layer;
   at least one layer of polyolefin polymer coated on an inner surface of the first tie layer;
   a second tie layer positioned on an inner surface of the at least one layer of polyolefin polymer;
   a second nylon 6 scalping barrier layer on an inner surface of the second tie layer;
   a third tie layer positioned on an inner surface of the second nylon 6 layer; and,
   a heat-sealable polymer layer coated on an inner surface of the third tie layer.

2. The laminate structure according to claim 1 wherein said at least one layer of polyolefin polymer on an inner surface of the first tie layer has a coating weight of about 12 to about 24 lbs/3,000 sq. ft.

3. The laminate structure according to claim 1 wherein said heat sealable polymer layer on an inner surface of the third tie layer has a coating weight of about 3 lbs/3,000 sq. ft.

4. A laminate structure consisting of:
   a paperboard substrate having an inner surface and an outer surface:
   a layer of a heat-sealable polymer coated on the outer surface of the paperboard substrate;
   a first layer consisting of nylon 6 coated on the inner surface of the paperboard substrate at a coating weight of at least about 5 lb/3,000 sq. ft;
   a first tie layer coated on an inner surface of the first nylon 6 layer;
   at least one layer of polyolefin polymer coated on an inner surface of the first tie layer and having a coating weight of about 12 to about 24 lbs/3,000 sq. ft;
   a second tie layer positioned on an inner surface of the at least one layer of polyolefin polymer;
   a second nylon 6 layer positioned on an inner surface of the second tie layer;
   a third tie layer positioned on an inner surface of the second nylon 6 layer; and,
   a heat-sealable polymer layer having a coating weight of about 3 lbs/3,000 sq. ft Positioned on an inner surface of the third tie layer.

* * * * *